United States Patent [19]

Cruse

[11] 4,223,953
[45] Sep. 23, 1980

[54] ANTI-COMPOUNDING BRAKE SYSTEM AND VALVE FOR HYDRAULIC CAM BRAKE ACTUATORS

[75] Inventor: Oliver B. Cruse, Florissant, Mo.
[73] Assignee: Wagner Electric Corporation, St. Louis, Mo.
[21] Appl. No.: 944,698
[22] Filed: Sep. 22, 1978
[51] Int. Cl.² .............................................. B60T 13/22
[52] U.S. Cl. ....................................... 303/2; 303/6 M; 303/9; 303/13; 303/71
[58] Field of Search ................... 303/13, 9, 2, 28–30, 303/40, 6 M, 71, 6 C; 188/170

[56] References Cited
U.S. PATENT DOCUMENTS

| | | | |
|---|---|---|---|
| 2,406,284 | 8/1946 | Fitch | 303/6 C |
| 3,443,839 | 5/1969 | Hinrichs et al. | 303/13 X |
| 3,456,988 | 7/1969 | Gibbons et al. | 303/71 X |
| 4,003,605 | 1/1977 | Fannin | 303/71 X |

Primary Examiner—Douglas C. Butler
Attorney, Agent, or Firm—Eyre, Mann, Lucas & Just

[57] ABSTRACT

In a hydraulic brake system which combines a spring actuated, hydraulically released parking brake system with a hydraulically actuated service brake system and in which the parking and service brake systems both operate through a common force-transmitting element on the brakes, and in which the fluids in the two brake systems are mutually incompatible, an anti-compounding valve limits the sum of the forces which can be transmitted by the common force-transmitting element when the service and parking brake systems are simultaneously applied and which maintains the fluid in the two brake systems isolated from each other.

20 Claims, 3 Drawing Figures

ANTI-COMPOUNDING BRAKE SYSTEM AND VALVE FOR HYDRAULIC CAM BRAKE ACTUATORS

BACKGROUND OF THE INVENTION

Automotive brakes are of two general classes, namely hydraulic fluid operated and air pressure operated. Air pressure operated brakes have found wide application in heavy vehicles due to the convenience of transmitting compressed air from the point of control to the point of application. One popular type of air-pressure operated brakes, particularly on trucks, tractors and semi-trailers, is a cam actuated brake in which a push rod from an air actuating chamber mechanically displaces a cam through a slack adjuster which, in turn, amplifies the force and transmits it to the brake shoes. Another well-known type of air pressure operated brakes is a wedge actuated brake.

One of the problems encountered in air brakes is the provision of safe parking brakes when the air pressure had dissipated after engine shutdown or upon separation of the semi-trailer from the tractor. A widely used solution to the parking brake problem is the provision of a spring-engaged, air-released parking brake integrated with the air actuated service brake. In this system, release of the spring-actuated parking brakes is impossible until air pressure is available to perform it. Thus, the condition of a runaway vehicle completely lacking brakes is avoided.

Air brakes are necessarily relatively expensive compared to hydraulic brakes due to the need for air compressors, hoses and other accessories such as valves, relays and controls. In large vehicles, however, manual pedal input alone is insufficient to generate the magnitude of hydraulic fluid pressure needed to adequately actuate the brakes. Several types of boosted hydraulic brakes are employed which augment the manual input using air or fluid pressure or vacuum controlled by the manual input to achieve the required hydraulic pressure. One type of boosted hydraulic brake system employs the hydraulic pressure available from a power steering system to boost the operator's mechanical input force to the higher levels necessary to apply the brakes of truck vehicles. In this type of system, the power steering fluid is circulated through a booster which, when actuated by the operator's control substantially increases the fluid pressure in the brake fluid lines as compared to manual input alone. As in air brake systems, the mechanical output of the brake cylinder can be applied to cam operated or wedge operated brakes. Also as in the air brakes, the problem of providing a parking brake remains. In another type of boosted hydraulic brake system, hydraulic pressure of hydraulic transmission fluid from an automatic transmission fluid is used to boost the operator's mechanical input force to apply the service brakes and to release the parking brakes.

A spring-applied, fluid-release parking brake, similar in principle to the parking brake employed in air pressure systems is combined with the hydraulic service brakes to economically and compactly provide parking brakes in a cam operated hydraulically actuated brake system. The parking brake actuator and the service brake cylinder operate through a common linkage to actuate the cam operated brakes.

Hydraulic fluid is employed in the brake cylinder whereas power steering fluid is employed in the parking brake. These two materials are incompatible with each other and must be maintained separate from each other.

In both air and hydraulic systems, the problem of brake compounding can occur. Brake compounding is defined as the condition under which the force applied by the parking brakes is added to the force applied by the service brakes to the linkage, slack adjusters, drums and brakes. This can easily occur in either system when the service brakes are applied while in parking brakes are engaged. Compounding of forces in this manner could cause overstressing of brake components and brake drums. In air systems, anti-compounding is employed using a valve which transfers control of the brakes from one source of air pressure to another and thus avoids the additive application of force to the brakes. A simple two-way check valve is commonly employed for this purpose. A simple transfer mechanism such as a two-way check valve is not used in hydraulic brake systems because of the incompatibility of the hydraulic brake fluid with the other dissimilar fluid.

SUMMARY OF THE INVENTION

The present invention solves the problem of compounding of parking brake and service brake forces in a combined hydraulic brake system. An anti-compounding valve, which maintains the brake fluid isolated from power steering fluid automatically reduces parking brake force in response to application of the service brakes above a threshold value. For each incremental increase of brake fluid pressure above the threshold value, a proportionate increase in fluid pressure of power steering fluid is fed to the parking brakes thus providing a proportionate decrease in spring-actuated parking brake force. Although it is possible to make the proportionate decrease in parking brake force bear any desired relationship to the increase in service brake force, approximate equality between the force changes is desired in order to maintain total braking force substantially constant at a value slightly greater than normal parking brake force alone.

The anti-compounding valve contains a piston having larger and smaller effective areas. An effective area is defined as an area having the same force-generating effect as the area considered. The larger area is exposed to the power steering fluid pressure being fed to the parking brakes. The smaller area is exposed to the hydraulic brake fluid being fed to the service brakes. The forces developed on the larger and smaller areas are opposed to each other. When the parking brakes are applied by releasing the power steering fluid therein, no fluid pressure is exerted against the large area piston. Consequently, the existence of service brake fluid pressure at this time acts on the small area piston which must then overcome only frictional forces to begin to move. A control valve, connected to the two area piston is displaced when the hydraulic fluid pressure attains a given threshold. The control valve valves a metered amount of power steering fluid to a relay valve which thereupon applies a metered amount of power steering fluid to the parking brake and back to the large are a piston of the anti-compounding valve. Thus, the anti-compounding valve is moved toward a condition of equilibrium in which the control valve neither admits nor exhausts fluid pressure. The fluid pressure fed to the parking brake reduces the parking brake force in proportion to the amount of brake fluid pressure exceeding the threshold. It is possible to make the reduction in parking brake force approximately equal to the increase in service brake force by adjusting the areas of the large and small piston in the anti-compounding valve.

Although the detailed description of the invention provides a complete disclosure of a system employing pressurized power steering fluid with a service brake system employing brake fluid, the present invention contemplates other combinations of pressurized media such as air pressure released parking brakes combined with hydraulic fluid pressure service brakes and vice versa, air pressure from two sources separately feeding the same brake system and any two fluids which necessity and/or convenience dictates should be maintained isolated from each other.

In addition to the cam-operated brakes described in the detailed embodiment of the present invention, other types of mechanically actuated brakes which have a common force-transmitting element may be actuated according to the teaching of the present invention. For example, wedge-actuated brakes may be directly substituted for the cam-actuated brakes of the detailed description. Both drum-type and disc-type brakes are contemplated in the present invention.

DETAILED DESCRIPTION OF THE PREFERRED EMBODIMENT

Figure 1A:
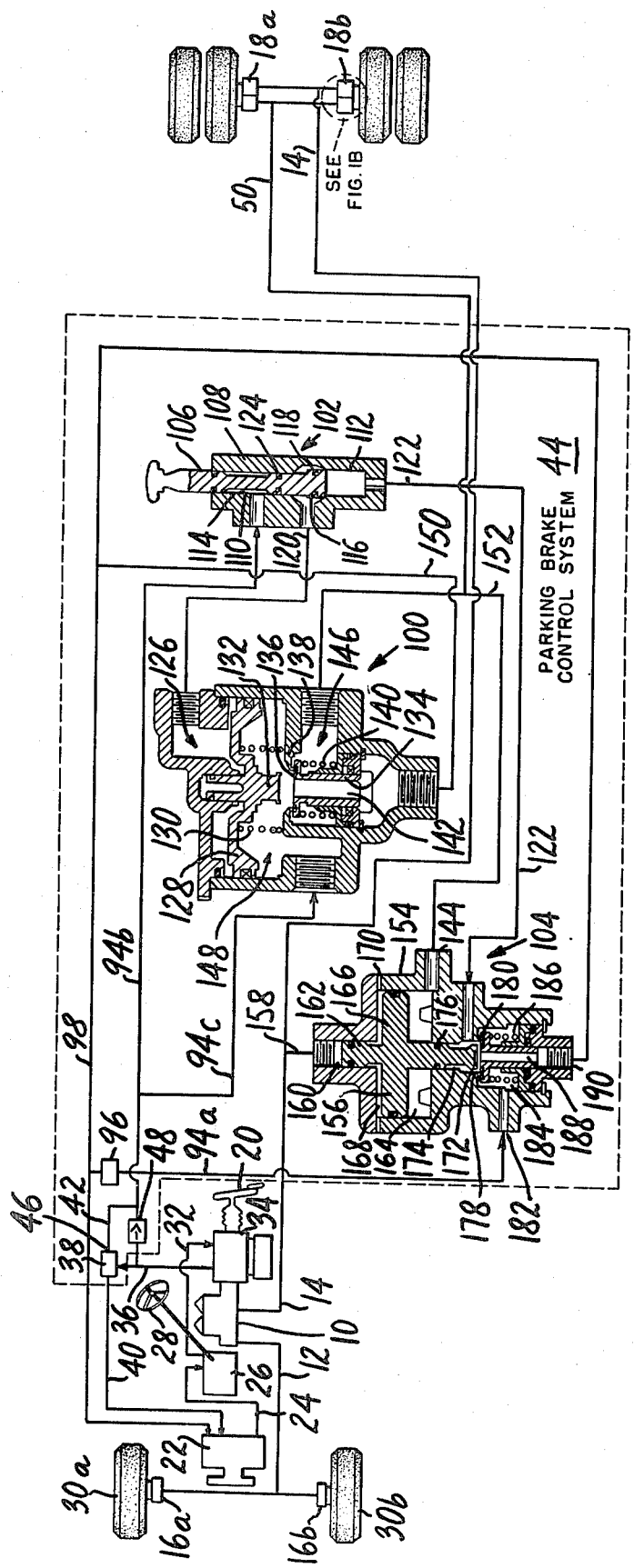
FIG. 1A shows a schematic diagram of the system according to the present invention including an anti-compounding valve.

Referring to the Figure, a dual master cylinder 10 provides pressurized brake fluid on conduits 12 and 14 to front brake cylinders 16a, 16b and rear brake cylinders 18a, 18b respectively. Brake fluid pressure is developed in conduits 12 and 14 by actuation of the operator's control such as brake pedal 20.

A power steering pump 22 is effective when the engine (not shown) is running to generate a flow of power steering fluid on power steering output line 24 for connection to the power steering gear 26 and through conduit 32 to hydraulic brake booster 34. From hydraulic brake booster 34, the power steering fluid returns via conduit 36 and diverter valve 38 to return line 40 which returns the power steering fluid to the power steering pump 22.

In the absence of a steering signal on power steering gear 26, the power steering fluid circulates through the power steering gear 26 at low pressure. Upon manipulation of the steering wheel 28 to the left or the right, the power steering gear 26 diverts a proportionate amount of power steering fluid to actuating mechanism which deflects the front wheels 30a, 30b proportionately left or right to turn the vehicle.

When the brake pedal 20 is actuated with power steering fluid circulating from conduit 32 to conduit 36, the hydraulic brake booster 34 utilizes the power steering fluid pressure available to it to proportionately boost the brake fluid pressure on conduits 12 and 14 according to the mechanical input from brake pedal 20. For example, and not as a limitation, manual input to brake pedal 20, without power steering fluid flow through hydraulic brake booster 34 may accomplish a brake fluid pressure in conduits 12 and 14 of from about 100 psig to about 250 psig. With power steering fluid circulating through the hydraulic brake booster 34, actuation of brake pedal 20 may accomplish the generation of brake fluid pressure in conduits 12 and 14 as high as 1500 psig to 2000 psig or more with the same manual input to brake pedal 20.

Under equilibrium conditions in which no demand is made on the power steering system either for deflecting the front wheels 30a, 30b by the power steering gear 26 or actuating the service brakes by hydraulic brake booster 34, the power steering fluid pumped by power steering pump 22 normally flows at low pressure through conduit 24, power steering gear 26, conduit 32, hydraulic brake booster 34, diverter valve 38 and return line 40 back to the power steering pump 22. Whenever steering wheel 28 or brake pedal 20 are manipulated from their equilibrium positions, their respective power steering gear and hydraulic brake booster 34 tend to restrict the free flow of power steering fluid and divert it to actuation of the power steering or brakes.

The diverter valve 38 normally provides open fluid communication between conduit 36 and 40. A sensing line 42 from a parking brake fluid system shown generally at 44, is connected to a sense input 46 of diverter valve 38. When the fluid pressure in sensing line 42 falls below a predetermined value, for example, 80 psig, the diverter valve 38 restricts the flow of power steering fluid such that an elevated pressure is created in conduit 36. Check valve 48 permits the elevated pressure to flow from conduit 36 into the parking brake fluid system 44 to elevate the pressure therein until it attains the predetermined pressure required at the sensing input 46 of diverter valve 38. Thereupon, diverter valve 38 resumes open communication between conduit 36 and return line 40. The service and parking brake components described in the preceding paragraphs are conventional and do not constitute per se an inventive part of the present invention. Therefore, detailed description of their structure is omitted.

The parking brake control system 44 controls the application and venting of power steering fluid on parking brake line 50 to the parking brake portion of rear brakes 18a, 18b.

Figure 1B:
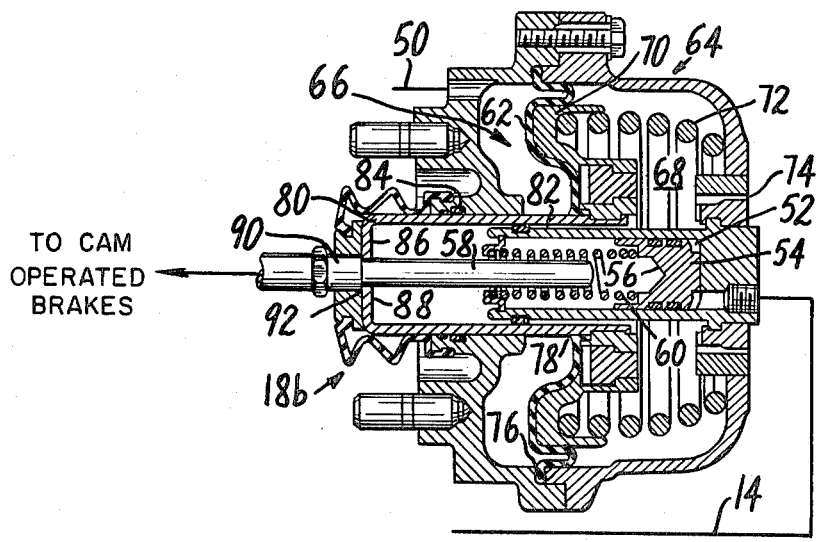
FIG. 1B shows a detailed drawing of brake 18B.

Turning now to FIG. 1B, the detailed inset drawing of brake 18b, a service brake cylinder 52 containing a service brake piston 54 is fed service brake fluid pressure from conduit 14 tending to displace the service brake piston 54 leftward in the drawing. An abutment cavity 56 is provided in the forward end of service brake piston 54 to abut and apply force to actuator push rod 58 when the service brake piston 54 is displaced leftward by the application of brake fluid pressure. A return spring 60 of negligible force tends to return the service brake piston 54 to its rest position shown, in the absence of brake fluid pressure.

A parking brake membrane 62 divides a parking brake chamber 64, into a fluid region 66 and an air region 68. A power plate 70 to which the parking brake membrane conforms is urged toward the fluid region by a parking blade spring 72. An atmospheric vent 74 permits the entry and exit of atmospheric air pressure into the air region to prevent interference with the action of the parking brake.

The parking brake membrane 62 is sealed at its outer perimeter 76 to the housing of the parking brake chamber 64 and at its inner perimeter 78 to a park apply sleeve 80. The park apply sleeve 80 is attached to, and moves with, the power plate 70. The park apply sleeve 80 is axially guided on the outer cylindrical surface 82 of the service brake cylinder 52. An annular seal 84 prevents the loss of parking brake fluid between the housing and the park apply sleeve 80.

The park apply sleeve 80 has an inward-directed flange 86 with an axial hole 88 therein which provides a sliding fit with the inner portion of the actuator push rod 58.

An outer portion 90 of the actuator push rod 58 has a larger diameter than the inner portion to provide an abutment surface 92 for abutment with the inward directed flange 86. Thus, the actuator push rod 58 is displaced leftward by leftward motion of the park apply sleeve 80 and the power plate 70. It is to be noted that as shown, with the parking brakes applied by the absence of power steering fluid pressure in fluid region 66, application of the service brakes can still shuttle service brake piston 54 leftward against the end of actuator push rod 58 and add the service brake force to the parking brake force provided by parking brake spring 72.

The effective area in the fluid region 66 of the parking brake chamber 64 is much greater than the effective area in service brake cylinder 52. Consequently, it requires a lower pressure of parking brake fluid in fluid region 66 to develop a given force component than it does in service brake cylinder 52 to develop the same amount of force.

The apparatus in parking brake control system 44 which prevents the unlimited compounding of parking brake and service brake forces is described in the following.

Regulated pressure conduits 94a, 94b, 94c are all supplied with the regulated pressure controlled by diverter valve 38. This regulated pressure is suitably from about 50 to about 100 psig and most preferably between about 75 and about 85 psig. A relief valve 96 opens in the event that the pressure in the regulated pressure conduits exceeds a predetermined value and vents successive pressure into a power steering fluid return line 98 through which the relieved power steering fluid is returned to the power steering pump 22.

A relay valve 100 controlled by a hand control valve 102 cooperates with an anti-compounding valve 104 to control the application of the regulated fluid pressure via parking brake line 50 to the fluid region 66 of the parking brake chamber 64 and also controls the release of power steering fluid from the parking brake chamber 64.

The parking brake control system 44 is shown in the parking brake applied condition with the stem 106 of hand control valve 102 pulled and with no more than negligible pressure in service brake conduit 14.

Hand control valve 102 has a body 108 containing a stepped bore 110 which has a larger diameter 112 and a smaller diameter 114. A valve head 116 having a resilient seal 118 thereon is guided for fitting into and sealing the larger diameter 112 when the stem 106 is pressed in. The valve head 116 is withdrawn free of the larger diameter 112 when the stem 106 is pulled as shown in the figure. In the pulled position shown, the hand control valve 102 provides open fluid communication between relay valve control line 120 and exhaust line 122. In addition, intermediate seal 124 on stem 106 isolates regulated pressure conduit 94b from the other two connections to hand control valve 102.

When stem 106 is pulled fully into the body 108 in order to release the parking brakes, valve head 116 becomes sealingly engaged in the larger diameter 112 and intermediate seal 124 is moved out of contact with the smaller diameter 114 thereby providing open fluid communication between regulated pressure conduit 94b and relay valve control line 120. At this time, exhaust line 122 is isolated from the other two connectors in the hand control valve 102.

Relay valve 100 contains a control region 126 in open fluid communication with relay valve control line 120. A control piston 128 is sealably disposed in control region 126 and is acted upon by the presence of power steering fluid pressure in control region 126 to generate a net downward force against the negligible upward force of return spring 130. A moveable valve member 132, connected to control piston 128 is displaceable with respect to valve shuttle 134. A combination valve seat 136 is normally in sealing contact with a stationary valve member 138. A valve shuttle return spring 140 urges the combination valve seat 136 into its sealing contact with stationary valve member 138. A passage 142 passes axially through valve shuttle 134 and communicates with a vent conduit 150 which is connected to power steering fluid return line 98. An inlet chamber 146 in relay valve 100 is in open fluid communication with regulated pressure conduit 94c. In the condition shown, valve shuttle 134 and combination valve seat 136 isolate the inlet chamber from the remainder of the relay valve 100. A delivery chamber 148 is located in the relay valve 100 on the opposite side of control piston 128 from the control region 126. The delivery chamber 148 is in open fluid communication with parking brake inlet 144 of anti-compounding valve 104. In the absence of power steering fluid pressure in control region 126, and the resultant upward displacement of control pison 128, moveable valve member 132 is out of sealing contact with combination valve seat 136. This places delivery chamber 148 in open fluid communication with vent conduit 150 and provides substantially zero psig to the parking brakes via parking brake line 50.

When power steering pressure exists in control region 126, control piston 128 and moveable valve member 132 are displaced downward until moveable valve member 132 comes into sealing contact with combination valve seat 136. This isolates passage 142 from delivery chamber 148. Upon an additional increase in pressure in control region 126, the downward force exerted by moveable valve member 132 on combination valve seat 136 displaces valve shuttle 134 downward against the resisting force of valve shuttle return spring 140 and unseats combination valve seat 136 from stationary valve member 138. This permits controlled fluid communication of power steering fluid from regulated pressure conduit 94c past combination valve seat 136 through delivery chamber 148 and conduit 152 to parking brake inlet 144 of anti-compounding valve 104 and also through parking brake line 50 to the fluid region 66 of rear brakes 18a, 18b.

The combination valve 136 admits sufficient power steering fluid into delivery chamber 148 to just counterbalance the downward force due to control fluid pressure in control region 126. When such a counterbalance is attained, the combination valve 136 makes seating contact both with moveable valve member 132 and with stationary valve member 138. This maintains the established value of power steering fluid pressure in the parking brakes.

The anti-compounding valve 104 has a housing 154 in which a control shuttle 156 is free to displace axially in response to forces upon it. A branch conduit 158 connects service brake fluid from service brake conduit 14 to a service brake fluid reaction chamber 160. A small piston head 162 on control shuttle 156 is sealably disposed in service brake fluid reaction chamber 160. The parking brake inlet 144 is connected to a parking brake fluid reaction chamber 164 which receives power steering fluid via conduit 152 from relay valve 100. A large piston head 166 on control shuttle 156 is sealably disposed in parking brake fluid reaction chamber 164. An atmospheric chamber 168 located between small piston head 162 and large piston head 166 remains at atmospheric pressure vented by at least one vent 170. By keeping the atmospheric chamber 168 vented, interference with the free motion of the control shuttle 156 is avoided.

A moveable valve member 172, connected to move with control shuttle 156, is disposed in an axial bore 174 in the housing 154 and is sealed from the parking brake fluid reaction chamber 164 by annular seal 176. A stationary valve member 178 is shown normally in contact with a combination valve seat 180. A regulated pressure inlet 182 connects regulated pressure conduit 94a to a regulated pressure inlet chamber 184. A spring 186 maintains the combination valve seat 180 is sealing contact with stationary valve member 178 in the condition assumed.

A fluid return bore 188 concentric with the combination valve seat 180 provides fluid communication between axial bore 174 and a fluid return outlet 190. The fluid return outlet 190 is connected to power steering fluid return line 98.

OPERATION

During normal operation of the system, release of the parking brakes is accomplished by pushing in stem 106 of hand control valve 102. This communicates power steering fluid from regulated pressure conduit 94b through stepped bore 110 to relay valve control line 120. The full value of regulated power steering fluid pressure in control region 126 of relay valve 100 permits substantially the entire fluid pressure available at regulated pressure conduit 94c to pass through relay valve 100 and appear on parking brake line 50. This pressure releases the parking brake for normal road operation of the vehicle.

When the stem 106 of hand control valve 102 is pulled to the position shown, power steering fluid pressure in control region 126 is vented through relay valve control line 120, larger diameter 112 of hand control valve 102, exhaust line 122, past opened moveable valve member 172, through fluid return bore 188 and returns to the power steering pump 122 via power steering fluid return line 98. The low fluid pressure in control region 126 causes control piston 128 to move upward thus drawing moveable valve member 132 out of sealing contact with combination valve seat 136 and permits any power steering fluid pressure in fluid region 66 of the two rear brakes 18a, 18b to be returned on parking brake line 50 through passage 142 to the power steering fluid return line 98. The reduced pressure of power steering fluid in fluid region 66 permits parking brake spring 72 to press forward on the power plate 70 which advances park apply sleeve 80. The park apply sleeve 80 presses on abutment surface 92 which the reupon forces actuator push rod leftward in the drawing. This leftward movement of actuator push rod 58 is communicated to cam operated service brakes, not shown, and results in the application of the service brakes in this spring actuated parking function.

With the parking brakes applied as previously discussed, an attempted application of the service brakes would add the force of service brake piston 54 to the force of parking brake spring 72. However, anti-compounding valve 104 prevents more than a nominal increase in this total amount of force. When the vehicle operator attempts to apply the service brakes with the parking brakes applied, the increased pressure in service brake conduit 14, communicated via branch conduit 158 to service brake fluid reaction chamber 160, develops a downward force component on small piston head 162. Since there is at this time negligible power steering fluid pressure in parking brake fluid reaction chamber 164, control shuttle 156 is moved downward until moveable valve member 172 comes into sealing contact with combination valve seat 180. Further motion of control shuttle 156 is initially resisted by the upward force of spring 186 and by the net upward force derived from the regulated fluid pressure in regulated pressure inlet chamber 184. The value of service brake fluid pressure required to open combination valve seat 180 can be established at any predetermined value by adjusting the area of small piston head 162, the strength of spring 186 and the effective areas exposed to regulated fluid pressure in regulated pressure inlet chamber 184. In the preferred embodiment, the value of service brake pressure required to actuate the anti-compounding valve 104 is established at some value below that at which the human operator without the mechanical assistance of the hydraulic brake booster could achieve. In the most preferred embodiment, this value is established at about 400 psig.

As a result of the threshold value of brake fluid pressure at which the anti-compounding valve 104 becomes effective, the total braking force applied to actuator push rod 58 can rise above the value established by parking brake spring 72 alone to a value which is the combination of parking brake spring 72 and the force due to about 400 psig of brake fluid pressure. When the threshold value of brake fluid pressure is achieved, the downward force developed on small piston head 162 closes fluid return bore 188 and then cracks open combination valve seat 180 and permits a metered amount of fluid pressure to be connected into axial bore 174. This fluid pressure, not only acts upward on annular seal 176, but is connected via exhaust line 122 back through hand control valve 102 and relay valve control line 120 to control region 126. Approximately an equal value of power steering fluid is valved by relay valve 100 from regulated pressure conduit 94c past combination valve seat 136 and via parking brake line 50 to the parking brakes. This pressure in the fluid region 66 of the parking brakes opposes the force applied by parking brake spring 72 and thereby limits the total force applied to actuator push rod 58. The power steering fluid pressure equal to the value applied to the parking brakes is also applied via conduit 152 to parking brake fluid reaction chamber 164 in anti-compounding valve 104. When the power steering fluid pressure in parking brake fluid reaction chamber 164 generates an upward force sufficient to counterbalance the downward force due to the service brake fluid pressure in service brake fluid reaction chamber 160, the control shuttle 156 is moved upward into a holding position which seats combination valve seat 180 both on moveable valve member 172 and stationary valve member 178.

The power steering fluid pressure required in parking brake fluid reaction chamber 164 to just counterbalance the service brake fluid pressure in service brake fluid reaction chamber 160 is proportional to the ratio of the areas of the large piston head 166 and the small piston head 162. For example, if the large piston head 166 has an area which is 25 times greater than the area of the small piston head 162, each 25 psig increase in service brake fluid pressure in service brake fluid reaction chamber 160 can be counterbalanced by a one psig increase in power steering fluid pressure in the parking brake fluid reaction chamber 164. Furthermore, the ratios of areas of the large piston head 166 to the small piston head 162 is made substantially equal to the ratio of areas of the parking brake chamber 64 to the service brake cylinder 52. Therefore, the brake-force-reducing effect of power steering fluid pressure fed to the parking brake chamber 64 almost precisely cancels the increased force exerted by the service brake piston. As a result of the complementary area relationship, once the threshold value of service brake pressure is attained at which the anti-compounding valve 104 becomes effective to begin reducing parking brake force, the total force exerted on actuator push rod 58 remains substantially constant regardless subsequent increases in service brake force to as high as several thousand pounds.

As an example, for completeness of disclosure, and not as a limitation, assume that the threshold level at which anti-compounding valve 104 becomes effective is 400 psig and that the ratio of areas of the small piston head 162 to large piston head 166 is 1:25 and that the ratio of areas of the parking brake chamber 64 to the service brake cylinder is 25:1. If a service brake pressure in service brake fluid reaction chamber 160 reaches 500 psig (100 psig above threshold value), the anti-compounding valve 104 provides 4 psig of power steering fluid pressure on exhaust line 122 which is connected through hand control valve 102 into control region 126 of relay valve 100. This permits valving of 4 psig through relay valve 100 into delivery chamber 148 and subsequently to parking brake line 50 as well as through conduit 152 into parking brake fluid reaction chamber 164. At this point equilibrium is reached in anti-compounding valve 104 and the value of 4 psig is maintained on the parking brakes. This 4 psig has an effect on the parking brakes which is 25 times as great as the 100 psig service brake fluid pressure in excess of the 400 psig threshold being connected to the service brake cylinder. Consequently, the the entire effect of the 100 psig service brake pressure over threshold is cancelled by the proportionate reduction in total force on actuator push rod 58 due to the pressure of power steering fluid in fluid region 66 of parking brake chamber 64.

Other relationships of area ratio between anti-compounding valve 104 and brake 18 may advantageously be employed. For example, it may be desirable to reduce the total force on actuator push rod 58 as service brake fluid pressure increases significantly beyond the threshold value. Alternatively, it may be desirable to permit a slight or significant increase in total force on actuator push rod 58 for extremely high service brake fluid pressures. One skilled in the art, in the light of the present disclosure would be fully aware of the manner in which the area ratio relationships can be manipulated to achieve any of these conditions namely force reduction above threshold, force constant above threshold or force increase above threshold.

In the preferred embodiment, the full value of regulated fluid pressure in parking brake fluid reaction chamber 164 is capable of opposing the maximum attainable value of service brake fluid pressure in service brake fluid reaction chamber 160. For example, with the area and threshold relationships previously described, a regulated power steering fluid pressure of 80 psig is capable of opposing a total service brake fluid pressure of about 2400 psig. This includes the 400 psig threshold value previously discussed. If maximum service brake fluid pressures exceeding about 2400 psig are desired, they can be suitably opposed by varying the value of regulated power steering fluid pressure, the ratio of areas or combinations of these techniques.

Figure 2:
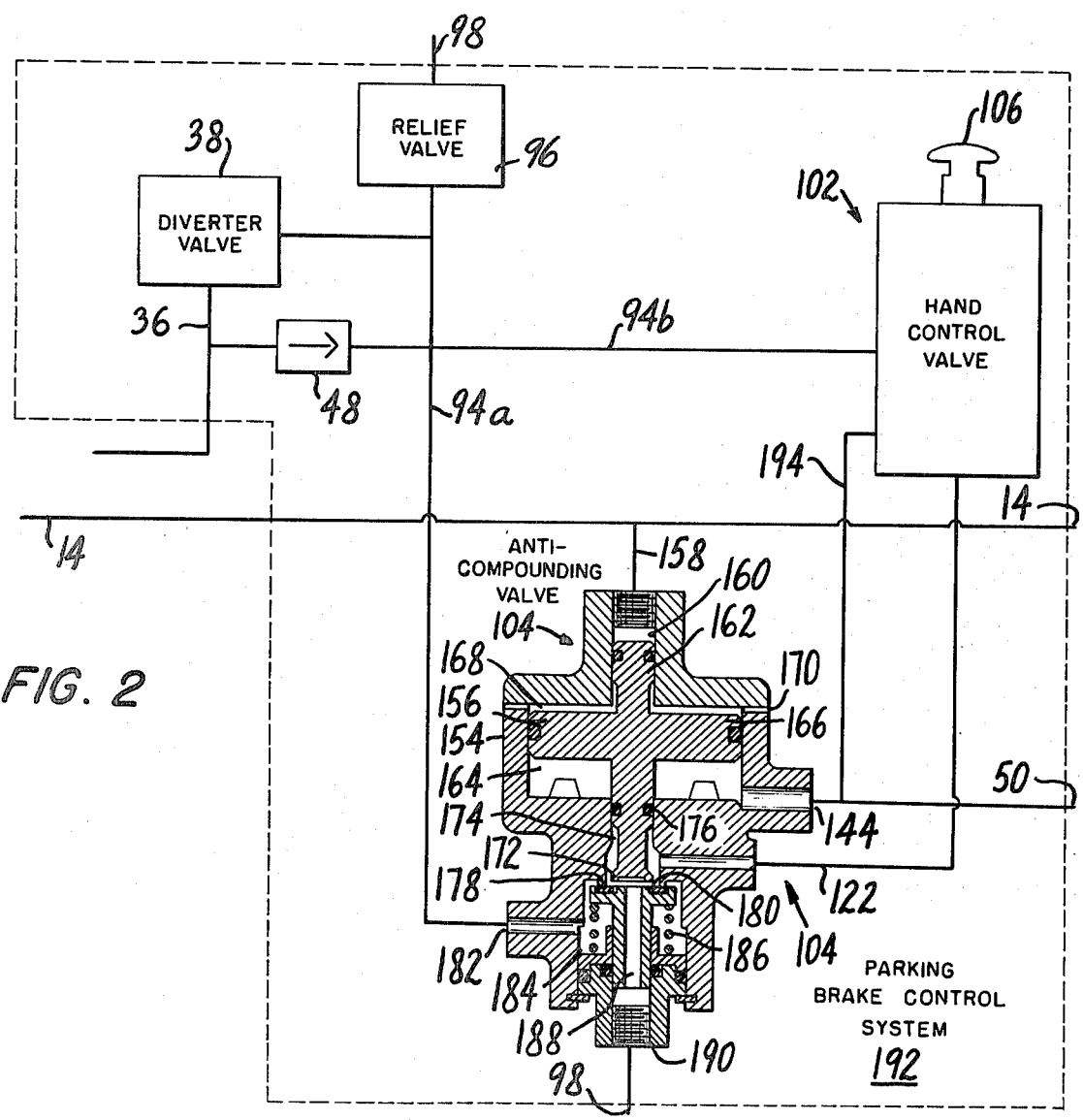
FIG. 2 shows a simplified schematic diagram of an embodiment of the parking brake control system which omits the relay valve used in the embodiment of FIG. 1.

The embodiment shown in FIG. 1 uses hand control valve 102 to control relay valve 100 which, in turn, controls the power steering fluid pressure fed on parking brake line 50 to the brakes. Relay valves, such as relay valve 100, are commonly used in brake systems to improve the speed of response of the brake system to applied forces. This frequently becomes desirable because of long and constricted lines from the control, such as hand control valve 102, to the remainder of the system. The resulting slow fluid flow increases the time for response by the brakes to control inputs. The parking brake control system 192 shown in FIG. 2 eliminates the relay valve of the embodiment shown in FIG. 1. Conduit 194 from hand control valve 102 is directly connected to parking brake inlet 144 of anti-compounding valve 104 and to parking brake line 50.

OPERATION OF EMBODIMENT SHOWN IN FIG. 2

When the stem 106 of hand control valve 102 is pressed into the brakes-released position, fluid pressure from regulator pressure conduit 94b is connected on conduit 194 and parking brake line 50 to release the parking brakes as described in connection with the embodiment shown in FIG. 1. When the stem 106 of hand control valve 102 is pulled into the brakes-applied position, conduit 194 and exhaust line 122 are connected together through the hand control valve 102. As in the previous embodiment, fluid pressure in parking brake line 50 is vented through conduit 194, hand control valve 102, exhaust line 122, anti-compounding valve 104 and power steering fluid return line 98 to release the pressure in the parking brakes and to thereby engage the parking brakes.

Upon an increase in hydraulic brake fluid pressure on service brake conduit 14 fed via branch conduit 158 to anti-compounding valve 104 which exceeds a predetermined value, suitably 400 psig, a portion of the regulated fluid pressure on regulated fluid pressure conduit 94a is valved through anti-compounding valve 104 to exhaust line 122. This pressure is communicated through hand control valve 102 and conduit 194 to the parking brake line 50 and to parking brake inlet 144 of the anti-compounding valve 104. When the proper balance of pressures at parking brake inlet 144 and branch conduit 158 is attained, anti-compounding valve 104 stops the increase in fluid pressure being valved through it to maintain this pressure on parking brake line 50.

It will be understood that the claims are intended to cover all changes and modifications of the preferred embodiments of the invention, herein chosen for the purpose of illustration which do not constitute departures from the spirit and scope of the invention.

What is claimed is:

1. A parking brake control system for operation with a hydraulic brake system which uses hydraulic brake fluid, comprising:
   (a) means for providing pressure of a fluid;
   (b) relay valve means for connecting a metered amount of said pressure from its input to its output in proportion to pressure at a control line, the fluid at said output being connected to a parking brake line;
   (c) control means having first and second conditions for connecting said fluid pressure to said control line in said first condition and for connecting an exhaust line to said control line in said second condition;
   (d) anti-compounding valve means for receiving said hydraulic brake fluid at a first connection and said fluid at a second connection;
   (e) first and second connected opposed pressure-responsive means in said anti-compounding valve means acted on in opposed directions by said hydraulic brake fluid and the fluid connected to said parking brake line respectively and displaceable therein according to the relative fluid pressure thereupon;
   (f) valve means connected to said first and second connected opposed pressure-responsive means for metering an amount of said pressure to said exhaust line in response to hydraulic brake fluid pressure exceeding the pressure of the fluid connected to said parking brake line by a predetermined amount; and
   (g) means in said anti-compounding valve means for maintaining said hydraulic brake fluid and said fluid isolated from each other.

2. The parking brake control system recited in claim 1 wherein said second opposed pressure responsive means has a greater area than said first pressure responsive means.

3. The parking brake control system recited in claim 1 further comprising:
   (a) at least one hydraulic brake having a brake piston having a first effective area acted upon by said hydraulic brake fluid;
   (b) at least one parking brake having a second effective area acted upon by the fluid in said parking brake line;
   (c) said first pressure responsive means having a third effective area;
   (d) said second pressure responsive means having a fourth effective area; and
   (e) the ratio of said first effective area to said second effective area being substantially equal to the ratio of said fourth effective area to said third effective area.

4. An anti-compounding valve which maintains two incompatible hydraulic brake fluids isolated from each other, the first hydraulic brake fluid being for actuation of service brakes and the second hydraulic brake fluid being for actuation of parking brakes, comprising:
   (a) a housing;
   (b) a control shuttle movable in said housing;
   (c) a first reaction chamber in said housing for receiving only said first hydraulic brake fluid;
   (d) a first piston head on said control shuttle sealably disposed in said first reaction chamber;
   (e) a second reaction chamber in said housing receiving only said second hydraulic brake fluid;
   (f) a second piston head on said control shuttle sealably disposed in said second reaction chamber;
   (g) said first and second reaction chambers being fluidly isolated from each other;
   (h) a regulated hydraulic fluid pressure inlet in said housing for receiving a regulated pressure of said second hydraulic brake fluid;
   (i) an exhaust outlet for said second hydraulic brake fluid;
   (j) a hydraulic fluid return outlet connected to said housing;
   (k) said regulated hydraulic fluid pressure inlet, said exhaust outlet, and said hydraulic fluid return outlet are fluidly isolated from said first and second reaction chambers;
   (l) movable valve means operable by said control shuttle for metering a controlled amount of said second hydraulic brake fluid from said regulated hydraulic fluid pressure inlet to said exhaust outlet and for sealing said hydraulic fluid return outlet under a first relationship of hydraulic pressures in said first and second reaction chambers for sealing all of said regulated hydraulic fluid pressure inlet hydraulic fluid return outlet and exhaust outlet under a second relationship of hydraulic pressures in said first and second reaction chambers and for metering a controlled amount of said second hydraulic brake fluid from said exhaust outlet to said hydraulic fluid return outlet and for sealing said regulated hydraulic fluid inlet under a third relationship of hydraulic pressures in said first and second reaction chambers.

5. In a brake system employing a first fluid for releasing at least one set of spring-applied parking brakes and a mechanically operated hydraulic service brake system employing a second fluid for operating mechanically operated brakes, wherein both parking and service brakes are exerted through at least one common mechanical actuating element, the improvement of an anti-compounding parking brake control system comprising:
   (a) regulator means for providing said first steering fluid at substantially constant regulated pressure;
   (b) a control valve having first and second conditions and first, second and third connections;
   (c) valve means in said control valve for connecting said first and second connections and blocking said third connection in its first condition and for connecting said second and third connections and blocking said first connection in its second condition;
   (d) said regulated pressure being connected to said first connection;
   (e) a control line connected to said second connection;
   (f) an exhaust line connected to said third connection;
   (g) relay valve means for connecting metered amounts of said first fluid pressure to and from said parking brakes in proportion to fluid pressure of said first fluid in said control line;
   (h) anti-compounding valve means having first and second connected opposed pistons moveable therein acted upon respectively by the fluid pressure of said second fluid applied to service brakes and the fluid pressure of said first fluid applied to said parking brakes for metering first fluid to and from said third connection in response to a predetermined relationship between the pressures acting on said first and second connected opposed pistons; and (i) means for maintaining said second fluid and said first fluid isolated from each other.

6. The brake system recited in claim 5 further comprising said predetermined relationship being a second fluid pressure exceeding a first fluid pressure by a predetermined amount.

7. The brake system recited in claim 6 wherein said predetermined amount is at least a predetermined fixed value.

8. The brake system recited in claim 6 wherein said predetermined amount comprises a predetermined fixed amount plus a predetermined ratio greater than 1 above said predetermined fixed amount.

9. The brake system recited in claim 8 further comprising:

(a) the effective area of said service brakes divided by the effective area of said parking brakes forming a second ratio; and (b) said second ratio being substantially equal to the inverse of said predetermined ratio.

10. A method for preventing compounding of fluid pressure operated, mechanically actuated brakes of the type in which hydraulic service brake and spring actuated, hydraulic fluid pressure released parking brakes, operated through a common linkage, said hydraulic fluid pressure released parking brakes utilizing hydraulic fluid which is incompatible with the hydraulic service brake fluid, comprising:

(a) comparing the ratio of hydraulic service brake fluid pressure fed to said service brakes and the hydraulic pressure fed to said parking brakes to a predetermined ratio while maintaining said hydraulic service brake fluid and the hydraulic parking brake fluid in isolation from one another; and (b) metering fluid pressure to said parking brakes in response to said ratio exceeding said predetermined ratio at a magnitude sufficient to reduce the parking brake force until the total force on said common linkage is substantially equal to the total force existing when said ratio is equal to said predetermined amount.

11. In a combined fluid actuated parking and service brake system in which said service brakes are applied by hydraulic brake fluid pressure and said parking brakes are spring applied and released by parking brake fluid pressure in a hydraulic brake fluid incompatible with the hydraulic service brake fluid, and wherein both service and parking brakes apply force through at least one common mechanical element, the improvement comprising:

(a) means for sensing the ratio of hydraulic service brake fluid pressure to the incompatible parking brake hydraulic fluid pressure; and (b) metering means actuated by said ratio exceeding a predetermined value for metering an amount of said incompatible parking brake hydraulic fluid pressure to said parking brakes which opposes said spring applied braking force at least in proportion to the amount by which said ratio exceeds said predetermined value.

12. The combined fluid actuated parking and service brake system recited in claim 11 further comprising the amount of said incompatible parking brake fluid pressure metered by said metering means above said predetermined value being sufficient to oppose the force of said spring with a force substantially equal to the increase in force of said service brake above the pressure existing at said predetermined value.

13. In a combined fluid actuated parking and service brake system in which said service brakes are applied by hydraulic brake fluid pressure and said parking brakes are spring applied and released by parking brake fluid pressure in a hydraulic fluid which is incompatible with the service brake fluid, and wherein both service and parking brakes apply force through at least one common mechanical element, the improvement comprising:

(a) means for permitting the combined force of said parking and service brakes on at least one common mechanical element to increase to a predetermined value in response to actuation of said service brakes in a predetermined amount while the parking brakes are applied; and (b) means for reducing parking brake force in proportion to the increase in service brake force above said predetermined amount applied through said at least one mechanical element.

14. The combined fluid actuated parking and service brake system recited in claim 13 wherein said proportion is substantial equality whereby the total force applied through said at least one common mechanical element remains substantially constant at said predetermined value.

15. The combined fluid actuated parking and service brake system recited in claim 13 further comprising means for maintaining the incompatible parking brake hydraulic fluid and the service brake hydraulic fluid isolated from each other.

16. A vehicle brake system having combined fluid parking and service brake means actuated through at least one common linkage, and using hydraulic brake fluid for at least one of said parking or service brake means comprising:

(a) first fluid pressure means for providing pressure to said service brake means;

(b) second fluid means for providing pressure to said parking brake means;

(c) relay valve means for connecting a metered amount of pressure from said second fluid pressure to said parking brake means in response to control pressure connected to said relay control valve means;

(d) anti-compounding valve means for providing control pressure from said second fluid pressure means in response to the pressure of said fluid pressure means connected to said anti-compounding valve; and (e) control valve means for connecting said control pressure provided by said anti-compounding valve to said relay valve means.

17. The vehicle brake system recited in claim 16 further comprising means for connecting said metered amount of pressure from said relay valve means to said anti-compounding valve to oppose the pressure of said first fluid pressure means.

18. The vehicle brake system recited in claim 16 further comprising means in said anti-compounding valve for maintaining the fluids in the first fluid pressure means separate from the fluid in the second fluid pressure means.

19. A parking brake control system for operation with a hydraulic brake system which uses hydraulic brake fluid, comprising:

(a) means for providing pressure of a fluid;

(b) control means having first and second conditions for connecting pressure of said fluid to a parking brake line in said first condition and for connecting an exhaust line to said parking brake line in said second condition;

(c) anti-compounding valve means for receiving said hydraulic brake fluid at its first connection and said fluid at a second connection;

(d) first and second connected opposed pressure responsive means in said anti-compounding valve means acted on in opposite directions by said hydraulic brake fluid and the fluid connected to said parking brake line respectively and displaceable therein according to the relative fluid pressure thereupon;

(e) valve means connected to said first and second connected opposed pressure responsive means for metering an amount of said pressure to said exhaust line in response to hydraulic brake fluid pressure exceeding the pressure of the fluid connected to said parking brake line by a predetermined amount; and (f) means in said anti-compounding valve for maintaining said hydraulic brake fluid and said fluid isolated from each other.

20. In a combined fluid actuated parking and service brake system in which said service brakes are applied by brake fluid pressure and said parking brakes are spring applied and released by fluid pressure, and wherein both service and parking brakes apply force through at least one common mechanical element, the improvement comprising:

(a) means for permitting the combined force of said parking and service brakes on said at least one common mechanical element to increase to a predetermined value in response to actuation of said service brakes in a predetermined amount while the parking brakes are applied;

(b) means for reducing parking brake force in proportion to the increase in service brake force above predetermined amount applied through at least one common mechanical element; and (c) said brake fluid pressure, is hydraulic brake fluid pressure and said fluid pressure is power steering fluid pressure.

* * * * *